(12) United States Patent
Duchin et al.

(10) Patent No.: US 11,074,591 B2
(45) Date of Patent: Jul. 27, 2021

(54) RECOMMENDATION SYSTEM TO SUPPORT MAPPING BETWEEN REGULATIONS AND CONTROLS

(71) Applicant: EMC IP Holding Company LLC, Hopkinton, MA (US)

(72) Inventors: Zohar Duchin, Brookline, MA (US); Corey J. Carpenter, Kansas City, MO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 229 days.

(21) Appl. No.: 16/177,950

(22) Filed: Nov. 1, 2018

(65) Prior Publication Data

US 2020/0143388 A1 May 7, 2020

(51) Int. Cl.
*G06Q 30/00* (2012.01)
*G06N 20/00* (2019.01)
*G06F 16/25* (2019.01)

(52) U.S. Cl.
CPC ......... *G06Q 30/018* (2013.01); *G06F 16/258* (2019.01); *G06N 20/00* (2019.01)

(58) Field of Classification Search
CPC ..... G06Q 30/018; G06N 20/00; G06F 16/258
See application file for complete search history.

(56) References Cited

U.S. PATENT DOCUMENTS

| | | | | |
|---|---|---|---|---|
| 7,716,150 B2 * | 5/2010 | Cheng | .................... | G06N 7/005 706/45 |
| 9,852,215 B1 * | 12/2017 | Sullivan | .............. | G06F 16/3334 |
| 9,967,285 B1 * | 5/2018 | Rossman | ................ | G06F 16/22 |
| 10,037,689 B2 * | 7/2018 | Taylor | ................ | G06K 7/10475 |
| 2011/0099139 A1 * | 4/2011 | Coldicott | ............... | G06Q 10/06 706/47 |
| 2011/0112973 A1 * | 5/2011 | Sanghvi | ............... | G06Q 30/018 705/317 |

(Continued)

OTHER PUBLICATIONS

Cleland-Huang, Jane, et al. "A machine learning approach for tracing regulatory codes to product specific requirements." Proceedings of the 32nd ACM/IEEE International Conference on Software Engineering-vol. 1. 2010. (Year: 2010).*

(Continued)

*Primary Examiner* — Asfand M Sheikh
(74) *Attorney, Agent, or Firm* — Ryan, Mason & Lewis, LLP

(57) ABSTRACT

A method in one embodiment comprises receiving at least one new authoritative source, accessing a plurality of existing controls and a plurality of existing authoritative sources, converting a data structure of the at least one new authoritative source and data structures of the plurality of existing controls and existing authoritative sources into a plurality of vector representations, using the plurality of vector representations to compute similarities between the at least one new authoritative source and at least a subset of the plurality of existing controls and existing authoritative sources, generating a plurality of candidate controls for mapping to the at least one new authoritative source, and transmitting to a user a recommendation identifying a proposed mapping of one or more of the plurality of candidate controls to the at least one new authoritative source.

20 Claims, 9 Drawing Sheets

(56) References Cited

U.S. PATENT DOCUMENTS

| | | | | |
|---|---|---|---|---|
| 2012/0011077 A1* | 1/2012 | Bhagat | ............... | G06Q 10/0635 |
| | | | | 705/317 |
| 2014/0379665 A1* | 12/2014 | Benjamin | .............. | G06Q 40/00 |
| | | | | 707/687 |
| 2018/0053128 A1* | 2/2018 | Costas | ................... | G06Q 50/18 |
| 2019/0197357 A1* | 6/2019 | Anderson | ............. | G06F 16/906 |
| 2019/0220753 A1* | 7/2019 | Ramamurthy | .......... | G06F 16/26 |
| 2020/0021600 A1* | 1/2020 | Simons | ................. | H04L 9/3239 |
| 2020/0174966 A1* | 6/2020 | Szczepanik | ............ | G06F 16/116 |
| 2021/0125297 A1* | 4/2021 | Doran | ................... | G06F 40/253 |

OTHER PUBLICATIONS

Wikipedia, "tf-idf," https://en.wikipedia.org/wiki/Tf%E2%80%93idf, Sep. 12, 2018, 7 pages.

Wikipedia, "Autoencoder," https://en.wikipedia.org/wiki/Autoencoder, Sep. 18, 2018, 6 pages.

Wikipedia, "Word Embedding," https://en.wikipedia.org/wiki/Word_embedding, Sep. 1, 2018, 4 pages.

M.-L. Zhang et al., "Binary Relevance for Multi-Label Learning: An Overview," Frontiers of Computer Science, Apr. 2018, pp. 191-202, vol. 12, No. 2.

Wikipedia, "Random Forest," https://en.wikipedia.org/wiki/Random_forest, Aug. 30, 2018, 13 pages.

Wikipedia, "Cosine Similarity," https://en.wikipedia.org/wiki/Cosine_similarity, Sep. 25, 2018, 6 pages.

\* cited by examiner

```
 1.  .....
 2.  Input:
 3.      control - object that holds all of a control information
 4.                and relevant methods
 5.      auth_source - object that holds all of an authoritative
 6.                    source information and relevant methods
 7.                    including similar authoritative sources
 8.                    that were found previously
 9.      similar_auth_sources - object that is the output of
10.                             auth_source.get_similat_auth_sources()
11.                             that contains information about the
12.                             similar authoritative sources
13.                             and relevant methods
14.      similarities_auth_source_to_control - object that hold information
15.                                            about the similarities between
16.                                            auth sources and controls and
17.                                            the ranks that they appear in
18.                                            and relevant methods
19.      grouping_tags_similarities - object that allows calculation of the
20.                                   similarities between auth_source
21.                                   tags and controls groupings
22.  Output:
23.      Feature vector for a pair auth_source and a control
24.      ...
25.  def authoritative_source_standards_features_vector(control,
26.                                                      auth_source,
27.                                                      similar_auth_sources,
28.                                                      similarities_auth_source_to_control,
29.                                                      grouping_tags_similarities):
```

FIG. 5

```
30.     AS_length = auth_source.length()
31.     control_length = control.length()
32.     length_ratio = AS_length / float(control_length)
33.     control_popularity = control.popularity()
34.     AS_to_control_similarity = similarities_auth_source_to_control.get_similarity(control.id, auth_source.id)
35.     control_similarity_rank = similarities_auth_source_to_control.get_rank(control.id,
36.                                                                            auth_source.id)
37.     similar_auth_source_rank = max(similar_auth_sources.get_ranks(control.id,
38.                                                                   similar_auth_sources))
39.     related_AS_max_similarity = max(similar_auth_sources.get_similarities(auth_source.id,
40.                                                                            control.id,
41.                                                                            similar_auth_sources))
42.     amount_of_AS = similar_auth_sources.count_control(control.id)
43.     similarity_of_grouping = grouping_tags_similarities.get_group_similarity(control.grouping,
44.                                                                              auth_source.tags)
45.
46.     return (AS_length, control_length, length_ratio, control_popularity,
47.             AS_to_control_similarity, control_similarity_rank, similar_auth_source_rank,
48.             related_AS_max_similarity, amount_of_AS, similarity_of_grouping)
49.
50. ''''' Create dataframe with features for each auth-source and control pair '''
51. auth_sources_features_df = pandas.DataFrame()
52. for i, candidate in enumerate(control_auth_source_candidated):
53.     control = candidate.get_control()
54.     auth_source = candidate.get_auth_source()
55.     features = authoritative_source_standards_features_vector(control,
56.                                                                auth_source,
57.                                                                auth_source.get_similar_auth_sources(),
58.                                                                similarities_auth_source_to_control,
59.                                                                grouping_tags_similarities)
60.     auth_sources_features_df.index[i] = (auth_source, control)
61.     auth_sources_features_df.iloc[(auth_source, control)] = features
```

FIG. 5 (Con't)

```
1.  '''
2.  Input:
3.      auth_sources_features_df - dataframe with features for each auth-source and control candidates
4.      features_standardScaler - objects that handles scaling of some of the features
5.      clf - classifier that predicts score for matching between auth-source and control
6.  Output:
7.      matches - dataframe with all auth-sources and controls pairs that passed
8.                the score threshold and will be suggested for mapping
9.  '''
10. def predict_matching(auth_sources_features_df,
11.                      features_standardScaler,
12.                      clf):
13.     X = similar_auth_source_features_df.copy()
14.     auth_source_features_hash = hash(str(X))
15.     columns_to_scale = ['AS_length', 'control_length',
16.                         'length_ratio', 'control_popularity',
17.                         'control_similarity_rank', 'similar_auth_source_rank',
18.                         'amount_of_AS']
19.     X[columns_to_scale] = features_standardScaler.transform(X[columns_to_scale])
20.     X['Score'] = clf.predict_proba(X)[:, 1]
21.     X['Match'] = test_X['Score'] > threshold
22.     matches = X.loc[X['Match'] == True, ['Score']]
23.     return matches
```

RECOMMENDATION SYSTEM TO SUPPORT MAPPING BETWEEN REGULATIONS AND CONTROLS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to a system for providing recommendations for accurate mapping between regulation and control data.

BACKGROUND

Governance, Risk and Compliance (GRC) products contain solutions such as Regulatory and Corporate Compliance Management (RCCM) for managing the ever changing laws and regulations with which an enterprise or organization, such as, for example, a corporation, financial institution or healthcare provider, must comply. Enterprises must also document the controls that they have in place, which are provided in documents that describe how they meet the requirements set forth by the laws and regulations (referred to herein as "authoritative sources"). By regularly reviewing the current controls, editing them and adding new controls, enterprises can ensure they are prepared to maintain compliance with changing and new authoritative sources.

Currently, the process for updating controls in view of new authoritative sources within RCCM solutions requires a thorough reading of new or updated authoritative sources in order to understand the requirements set forth therein. To further understand the impact on the enterprise, extensive searches through a current set of controls are necessary in order to determine which of the new requirements are already met, which controls need to be edited and/or whether new controls needs to be written. Such searches are performed using, for example, key word searches that are available through different text editors, such as PDF readers, and word and spreadsheet processors. This conventional approach is a time consuming and inefficient use of computer resources. For example, numerous non-relevant results which lack search result prioritization are retrieved, and a user is required to review many different controls before finding relevant controls and determining whether to map the controls to the new or updated authoritative sources. As an example, some researchers have estimated that from 2008 to 2016, there have been 25,155 new U.S. Federal regulations that have an estimated economic impact of $727 billion and resulted in 460 million hours of paperwork.

Accordingly, there is a need for an improved computer driven structure and process which is capable of efficient and accurate analysis of new or updated authoritative sources in connection with the current controls of an enterprise.

SUMMARY

In one embodiment, an apparatus comprises at least one processing platform including a plurality of processing devices. The processing platform is configured to receive at least one new authoritative source, access a plurality of existing controls and a plurality of existing authoritative sources, convert a data structure of the at least one new authoritative source and data structures of the plurality of existing controls and existing authoritative sources into a plurality of vector representations, use the plurality of vector representations to compute similarities between the at least one new authoritative source and at least a subset of the plurality of existing controls and existing authoritative sources, generate a plurality of candidate controls for mapping to the at least one new authoritative source, and transmit to a user a recommendation identifying a proposed mapping of one or more of the plurality of candidate controls to the at least one new authoritative source. The plurality of candidate controls are taken from the plurality of existing controls.

These and other illustrative embodiments include, without limitation, apparatus, systems, methods and computer program products comprising processor-readable storage media.

BRIEF DESCRIPTION OF THE DRAWINGS

FIG. 5 shows an example of pseudocode for extraction of relevant features from each authoritative source in an illustrative embodiment.

FIG. 6 shows an example of pseudocode for determining the likelihood that each candidate control will be mapped to a new autoritative source in an illustrative embodiment.

DETAILED DESCRIPTION

Figure 1:
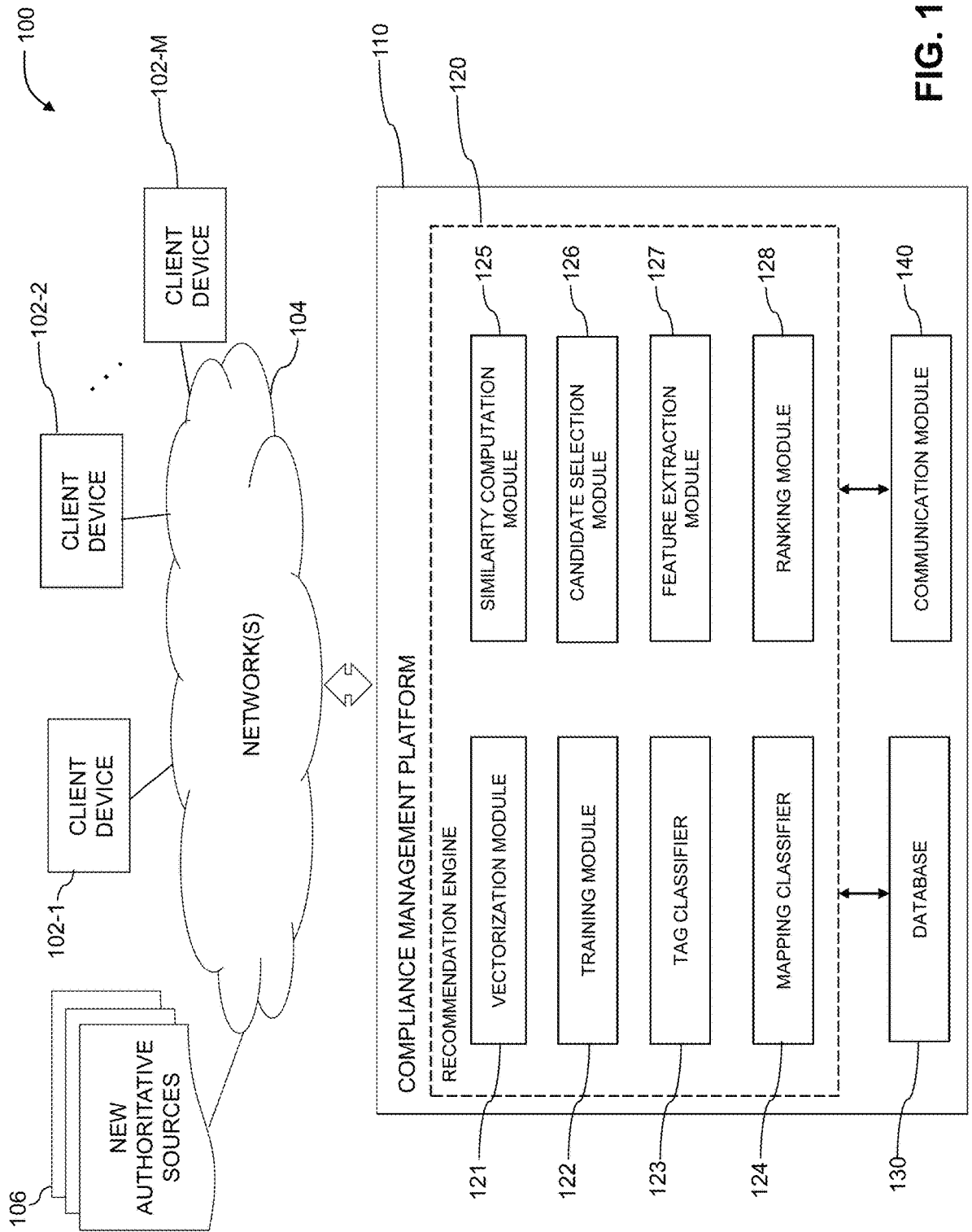
FIG. 1 is a block diagram of an information processing system comprising a compliance management platform configured for providing recommendations for data mapping between authoritative sources and enterprise controls in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

As used herein, an "authoritative source" refers to electronic content, such as, for example, an electronic document and/or electronic data structure, that may include several levels in its hierarchy, such as, for example, "source," "topic," "section," and/or "sub-section." Each of these levels may have a unique identification (ID) and a title. A unique ID can be, for example, any hashing function that is applied on the text of a document. The unique ID can be also an ID provided by a user according to a naming convention. One or more authoritative sources may comprise a regulation.

As used herein, a "control" refers to electronic content, such as, for example, an electronic document and/or electronic data structure, that includes a statement with instructions for an enterprise to comply with one or more authoritative sources. A control may include a unique ID and a title.

As used herein, "mapping" refers to a logic connection between one or more authoritative sources and one or more controls. An authoritative source may be mapped to one or more controls, and a control may be mapped to one or more authoritative sources. RCCM software solutions include mappings between authoritative source data structures and control data structures. In accordance with an embodiment of the present invention, an authoritative source is mapped to a control when they are linked together through a database. For example, in a user interface (UI), a user can see that an authoritative source is addressed, and there is a link to the relevant control. The logic connection between one or more authoritative sources and one or more controls can be manifested through data objects that hold this information.

As used herein, "tags" refer to terms (e.g. "access control") that authoritative sources and controls may have to generally describe their subjects. The tags can include descriptive metadata key words describing the authoritative sources and controls and portions thereof.

FIG. 1 shows an information processing system 100 configured in accordance with an illustrative embodiment. The information processing system 100 comprises client devices 102-1, 102-2, . . . 102-M (collectively "client devices 102"). The client devices 102 communicate over a network 104 with a compliance management platform 110.

The client devices 102 can comprise, for example, desktop, laptop or tablet computers, mobile telephones, or other types of processing devices capable of communicating with the compliance management platform 110 over the network 104. The variable M and other similar index variables herein such as K and L are assumed to be arbitrary positive integers greater than or equal to two.

The term "client" or "user" herein is intended to be broadly construed so as to encompass numerous arrangements of human, hardware, software or firmware entities, as well as combinations of such entities. Compliance management services may be provided for users utilizing one or more machine learning models, although it is to be appreciated that other types of infrastructure arrangements could be used. At least a portion of the available services and functionalities provided by the compliance management platform 110 in some embodiments may be provided under Function-as-a-Service ("FaaS") and/or Platform-as-a-Service ("PaaS") models, including cloud-based FaaS and PaaS environments.

The compliance management platform 110 in the present embodiment is assumed to be accessible to the client devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The compliance management platform 110, on behalf of respective infrastructure tenants each corresponding to one or more users associated with respective ones of the client devices 102, implements a recommendation engine 120 to provide clients with recommendations for mapping between authoritative sources and controls. According to an embodiment, the infrastructure tenants are cloud infrastructure tenants. By way of example, the recommendation services include providing enterprise compliance managers with recommendations for mapping between new authoritative sources and existing controls, allowing the compliance managers to accept a recommendation, or if needed, edit the controls prior to accepting a proposed mapping. The recommendation system also highlights authoritative sources that are likely to have no corresponding control from an existing set of controls, therefore requiring a user to develop a new control.

The compliance management platform 110 in some embodiments may be implemented as part of a cloud infrastructure in the form of a cloud-based system such as an AWS system. Other examples of cloud-based systems that can be used to provide at least portions of the compliance management platform 110 and possibly other portions of system 100 include GCE, and Microsoft Azure®.

In accordance with an embodiment of the present invention, the compliance management platform 110 provides a user with prioritized recommendations to map new authoritative sources to existing controls in an enterprise. Users are provided with insights and reasons for a recommended mapping including, for example, similar authoritative sources already mapped to a control, and similar text portions and/or similar intent within text portions between authoritative sources and controls. Conventional techniques for mapping new authoritative sources to existing controls rely on ineffective key word searches, which lack prioritization of results and can be overly time consuming by requiring a user to review numerous different and non-relevant controls before finding relevant controls and deciding to map them.

The compliance management platform 110 in the embodiment of FIG. 1 illustratively comprises a recommendation engine 120, a database 130 and a communication module 140. The database 130 includes, for example, existing authoritative sources, existing controls and mappings between the existing authoritative sources and controls. The communication module 140 includes appropriate interfaces, for example, application programming interfaces (APIs) for transmitting and receiving data to and from client devices 102 or other connected devices over the network 104. In accordance with one or more embodiments, the communication module 140 receives new authoritative sources 106 from external (e.g., out of enterprise) sources including, but not necessarily limited to, external databases, websites, blogs and/or forums. The authoritative sources 106 may also be held by respective clients in, for example, internal databases, sites, blogs and/or forums, and received by the communication module 140 through client devices 102. Mapping recommendations and rankings output from the recommendation engine 120 as described in more detail herein, are transmitted to the client devices 102 via the communication module 140.

In accordance with an embodiment of the present invention, the recommendation engine 120 includes a vectorization module 121, a training module 122, a tag classifier 123, a mapping classifier 124, a similarity computation module 125, a candidate selection module 126, a feature extraction module 127 and a ranking module 128. The components 121-128 of the recommendation engine 120 are used in connection with analytics for providing recommendations of mapping between new authoritative sources and controls.

In accordance with an embodiment of the present invention a training module 122 performs training given an existing set of authoritative sources, controls and their current mapping, which can be accessed from the database 130. A vectorization module 121 converts each document level (e.g., "source," "topic," "section," and/or "sub-section") in the existing set of authoritative sources into a vector that best represents its content. Conversion into the vector representations can be performed using, for example, term frequency-inverse document frequency (TF-IDF) methodology, which creates a vector where each element in the vector represents a word and the TF-IDF value is calculated based on the corpus of existing authoritative sources. TF-IDF is utilized to identify and rank key words or phrases based on a term's or phrase's frequent appearance in a particular document level of an authoritative source and lack of or infrequent appearance in the corpus of existing authoritative sources. For example, TF-IDF refers to a numerical statistic reflecting the importance of a word to a document level with respect to a corpus. The TF-IDF value increases proportionally to the number of times a word appears in the document level, but is also offset by the frequency of the word in the corpus, taking into account that some words are generally more common than others. It is to be understood that the embodiments of the present invention are not limited to the use of TF-IDF, and there are alternative methodologies for text vectorization including, but not necessarily limited to, neural networks, auto-encoders, and/or word embedding. An auto encoder is a type of artificial neural network used for learning a representation for a set of data for dimensionality reduction. Word embedding uses language modeling and feature learning techniques in natural language processing (NLP) to map words or phrases to vectors of real numbers. In general, in addition the techniques described above, machine learning techniques and components used in accordance with embodiments of the present invention may also include, but are not necessarily limited to, a Support Vector Machine (SVM), a Multilayer Perceptron (MLP), a deep learning model, decision trees, and clustering.

Similar to vectorization performed for the existing authoritative sources, the vectorization module 121 converts each of the existing controls, which each comprise a unique ID and a title, into a vector that best represents its content (e.g., the control statement). Like the authoritative sources, conversion into the vector representations can be performed using, for example, TF-IDF, neural networks, auto encoders, word embedding and/or other machine learning techniques.

The vector representations are used by the training module 122 to train tag classifier 123, which is a multi-label classifier used for the prediction of tags for given portions (e.g. textual portions) of an authoritative source. The tag classifier 123 uses existing tags of the current set of controls and/or authoritative sources as target variables. The algorithm used by the tag classifier 123 may include a binary relevance (BR) algorithm including the Random Forest algorithm as the base classifier, or any other available multi-label classification algorithm, which may use one or more of the machine learning techniques described herein.

Using the existing mapping between authoritative sources and controls, the training module 122 generates a mapping training set and a mapping validation set. The validation set corresponds to the new authoritative sources 106. As described in more detail herein below, the feature extraction module 127 extracts a plurality of features for each of the existing controls in the training set that are determined to be mapped to the authoritative sources 106 that are in the validation set. In general, the features include, but are not necessarily limited to: (i) similarities between the existing authoritative sources to which the determined controls are mapped; (ii) a ranking based on similarities in (i) compared with similarities of other existing authoritative sources (e.g., not mapped to the determined controls) to the existing authoritative sources to which the determined controls are mapped; (iii) similarities between the new authoritative source and the existing authoritative sources to which the determined controls are mapped; (iv) similarities between the new authoritative source and the determined controls; (v) a ranking based on similarities in (iii) and/or (iv) compared with similarities between the new authoritative source and other existing authoritative sources (e.g., not mapped to the determined controls) or other existing controls (not determined to be mapped to the new authoritative sources 106); (vi) the number of the existing authoritative sources to which the determined controls are mapped; (vii) similarities between predicted tags and existing tags assigned to the determined controls; (viii) a total number of existing authoritative sources to which a determined control has been mapped; and (ix) a total length (e.g., in words) of a determined control. The similarities include computed level and final similarity scores described herein. Rankings are computed by the ranking module 128.

Since it is known in the validation set whether or not mappings between new authoritative sources and existing controls exist, the training module uses this knowledge in order to train a mapping classifier 124 that determines a probability of whether a mapping exists between a new authoritative source and an existing control based on the extracted features.

Given a new authoritative source 106 received at the compliance management platform 110, the vectorization module 121 of the recommendation engine 120 converts each level (e.g., "source," "topic," "section," and/or "subsection") in the new authoritative source into its vector representation using, for example, vector conversion modules for each level that were constructed during training. If not previously performed, the vectorization module 121 also converts each level in each of the existing authoritative sources into their vector representations. The similarity computation module 125 computes a similarity score between each level in the new authoritative source and each level in the existing authoritative sources. In accordance with a non-limiting embodiment of the present invention, the similarity score is computed using cosine similarity between the two vector representations in each level.

The similarity computation module 125 computes a final similarity score between the new authoritative source and each existing authoritative source from the respective similarity scores corresponding to each level. In accordance with an embodiment of the present invention, the similarity computation module 125 uses the similarity score between the lowest levels available in the authoritative sources as the final similarity score. Authoritative sources may contain levels that become increasingly granular with respect to the description of the regulation. As used herein, a "lowest level" includes the most granular description in the authoritative source.

Alternatively, in other non-limiting examples, the similarity computation module 125 computes the average of the similarity scores of the levels, uses the median similarity score of the levels or uses the maximum similarity score as the final similarity score.

For each of the existing authoritative sources with a final similarity score with respect to the new authoritative source that is above a certain threshold, the candidate selection module 126 selects the existing controls that are currently mapped to these existing authoritative sources as candidate controls to be recommended to a user for mapping to the new authoritative source. In accordance with an embodiment of the present invention, thresholds referenced herein can be default values, which may be increased or decreased by a user.

In accordance with an embodiment of the present invention, if not previously performed, the vectorization module 121 also converts each of the existing controls into their vector representations. The similarity computation module 125 computes a similarity score between each level in the new authoritative source and the vector representations of the existing controls. In accordance with a non-limiting embodiment of the present invention, the similarity score is computed using cosine similarity between the vector representations in each level in the new authoritative source and the vector representations of the existing controls.

The similarity computation module 125 computes a final similarity score between the new authoritative source and each existing control from the respective similarity scores corresponding to each level. In accordance with an embodiment of the present invention, the similarity computation module 125 uses the similarity score between the existing controls and the lowest level available in the new authoritative source as the final similarity score. For example, in one embodiment, the vectorization module 121 converts a lowest level of the new authoritative source into a vector representation using a controls vector conversion module that was constructed during training. Then, the similarity computation module 125 computes a similarity score between the vector representation of the lowest level of the new authoritative source and the vector representations of the existing controls as the final similarity scores. Alternatively, in other non-limiting examples, the similarity computation module 125 computes the average of the similarity scores between the existing controls and the authoritative source levels, uses the median similarity score between the existing controls and the authoritative source levels or uses the maximum similarity score as the final similarity score.

In accordance with an embodiment of the present invention, there are two document corpuses, an authoritative source corpus and a controls corpus. For each corpus, a different vector conversion module, which converts text into vectors, is created. For example, in the case of TF-IDF vector conversion, each vector conversion module for each corpus includes its own vocabulary and term frequencies. Based on their different structures, the application of the same text to different vector conversion module will yield different results for each of the vector conversion modules. Embodiments of the present invention may apply the controls vector conversion module that was created using the controls corpus to an authoritative source (or apply the authoritative source vector conversion module that was created using the authoritative corpus to a control) in order to analyze how an authoritative source is viewed based on the controls, or how a control is viewed based on the authoritative sources.

For each of the existing controls with a final similarity score with respect to the new authoritative source that is above a certain threshold, the candidate selection module 126 selects these existing controls as candidate controls to be recommended to a user for mapping to the new authoritative source.

In addition, the trained tag classifier 123 determines probable tags for the new authoritative source. The similarity computation module 125 computes a similarity score between the probable tags determined by the tag classifier 123 and the existing tags that are assigned to the existing controls. In accordance with a non-limiting embodiment of the present invention, the similarity scores between the probable and existing tags are computed using cosine similarity. The candidate selection module 126 may also select each of the existing controls with a tag similarity score with respect to the new authoritative source that is above a certain threshold as candidate controls to be recommended to a user for mapping to the new authoritative source.

Figure 3:
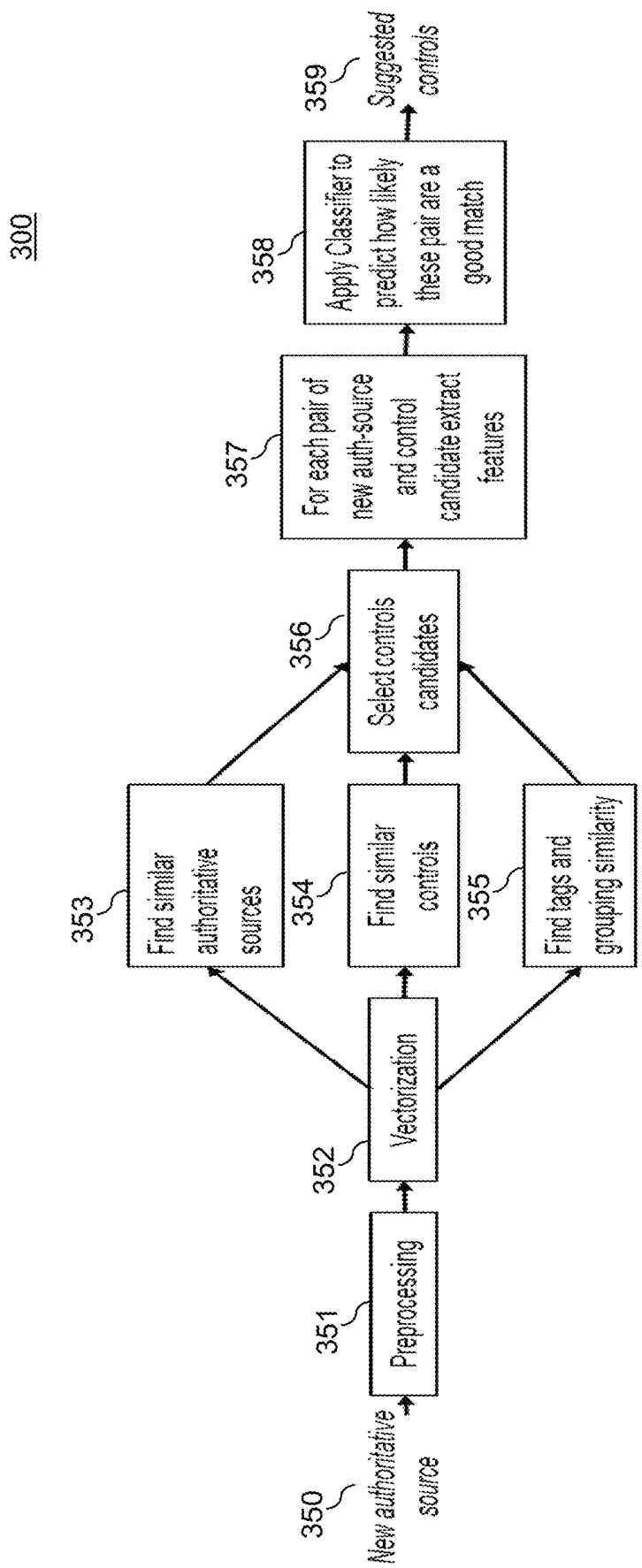
FIG. 3 is a flow diagram of a process for providing recommendations for data mapping between authoritative sources and enterprise controls in an illustrative embodiment.

In accordance with an embodiment of the present invention, the feature extraction module 127 extracts a plurality of features for each pair of the authoritative source and control candidates (see FIG. 3, block 357). Similar to the discussion above of the features of each of the existing controls in the training set that are determined to be mapped to the authoritative sources in the validation set, the features extracted for each of the control candidates include, but are not necessarily limited to: (i) similarities between the existing authoritative sources to which the candidate controls are mapped; (ii) a ranking based on similarities in (i) compared with similarities of other existing authoritative sources (e.g., not mapped to the candidate controls) to the existing authoritative sources to which the candidate controls are mapped; (iii) similarities between the new authoritative source and the existing authoritative sources to which the candidate controls are mapped; (iv) similarities between the new authoritative source and the candidate controls; (v) a ranking based on similarities in (iii) and/or (iv) compared with similarities between the new authoritative source and other existing authoritative sources (e.g., not mapped to the candidate controls) or other existing controls (not selected to be candidates to be mapped to the new authoritative sources 106); (vi) the number of the existing authoritative sources to which the candidate controls are mapped; (vii) similarities between predicted tags for the new authoritative source and existing tags assigned to the candidate controls; (viii) a total number of existing authoritative sources to which a candidate control has been mapped; and (ix) a total length (e.g., in words) of a candidate control. The similarities include computed level and final similarity scores described herein. Rankings are computed by the ranking module 128.

FIG. 5 shows an example of pseudocode 500 for extraction of relevant features from each authoritative source in an illustrative embodiment. The extracted features for each candidate control are input into the trained mapping classifier 124 which predicts a likelihood that each candidate control will be mapped to the new authoritative source (see FIG. 3, block 358). FIG. 6 shows an example of pseudocode 600 for determining the likelihood that each candidate control will be mapped to a new authoritative source in an illustrative embodiment. In accordance with an embodiment of the present invention, the likelihood may be expressed as a score between 0 and 1. If this score is above a specific threshold, the mapping of the candidate control to the new authoritative source is recommended (see FIG. 3, block 359). Using the communication module 140, the mapping recommendations of candidate controls to new authoritative sources are transmitted to the client devices 102 via the network(s) 104. In accordance with an embodiment of the present invention, in the event that no likelihood of mapping to an existing control is found for one or more authoritative sources, this result can be communicated to the client devices 102 with a recommendation that a new control be developed for the unmatched authoritative sources. Recommendations regarding unmatched authoritative sources can be transmitted to client devices 102 together with mapping recommendations of candidate controls to other new authoritative sources, or alone, for example, in the event that no mapping recommendations have been determined.

Figure 2:
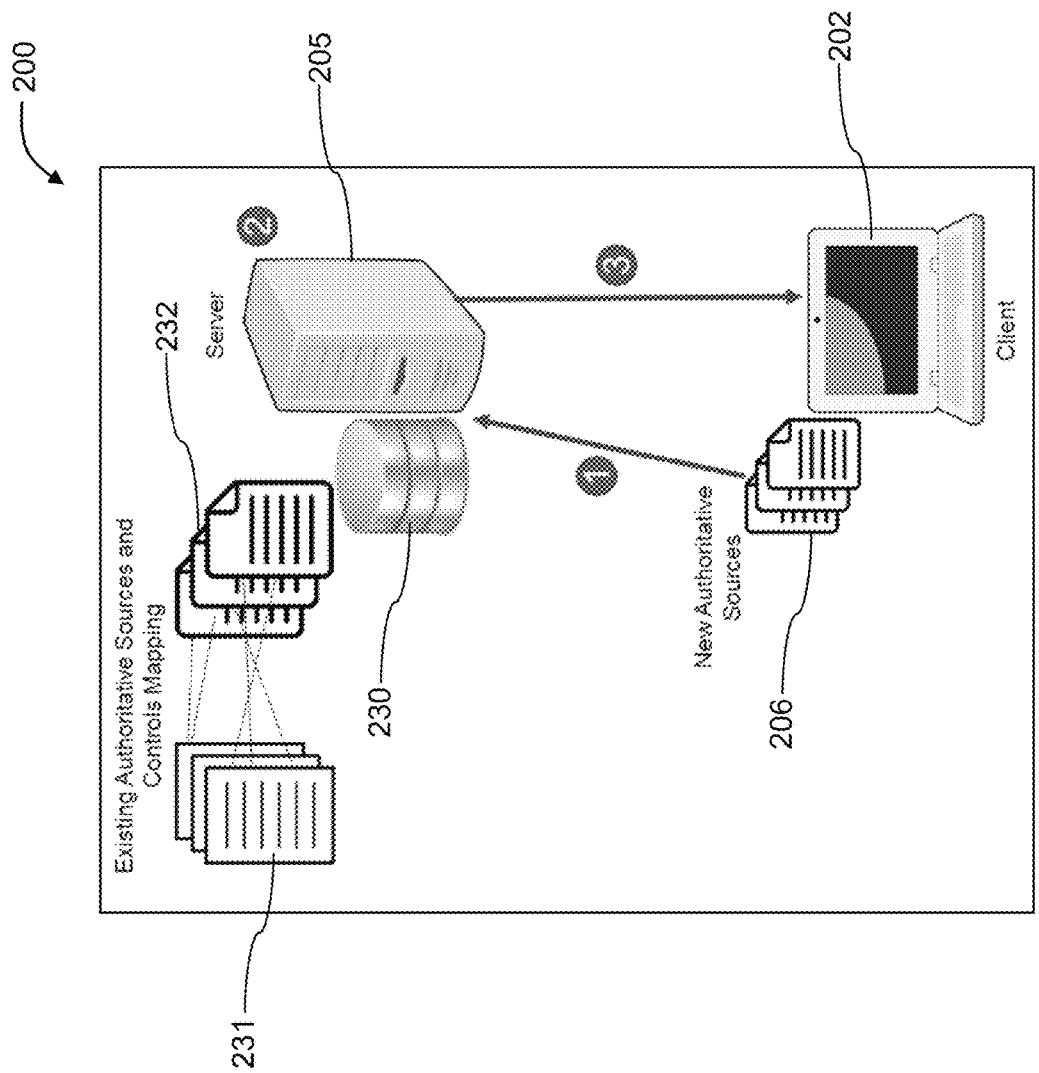
FIG. 2 is a block diagram of operations in client and compliance management platform environments in an illustrative embodiment.

FIG. 2 is a block diagram of operations in client and compliance management platform environments in an illustrative embodiment. Referring to FIG. 2, in a system 200 for recommending mapping between authoritative sources and controls, a database 230 stores electronic versions of existing controls 231 and existing authoritative sources 232 of an enterprise, and the mapping between the existing controls 231 and authoritative sources 232. A client on, for example, a client device 202 maintains an electronic version of a set of new authoritative sources 206 that need to be mapped to the existing controls 231 or to new controls.

One or more servers 205 include the compliance management platform 110, the recommendation engine 120 and/or components thereof. Upon transmission, receipt and uploading of the new authoritative sources 206 to the one or more servers 205 (high level step 1), the one or more servers 205 perform the required algorithms, analytics and training as described herein (high level step 2) and calculate the probability of mapping each new authoritative source 206 to an existing control 231. Recommendations for mapping the new authoritative sources 206 to existing controls 231 and/or determinations that new controls must be developed for one or more of the new authoritative sources are transmitted to the client device 202 (high level step 3).

The recommendation engine 120, database 130, communication module 140, and other components of the compliance management platform 110 comprise further hardware and software required for running the compliance management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The databases or cloud environments discussed herein (e.g., databases 130, 230) may comprise a database service, such as, but not necessarily limited to GCE Cloud Storage, Microsoft Azure Blob (Binary Large Object) Storage, DynamoDB, MongoDB, Amazon Aurora and Oracle database.

The recommendation services performed by the compliance management platform 110 can be performed based on real-time data from multiple sources retrieved over the network(s) 104, so that the information processing system can react to events as they happen. For example, the input data sources may include new authoritative sources captured in real-time, which may be processed by the compliance management platform 110 to generate recommendations for the end users of the client devices 102 reflecting real-time authoritative source updates.

Although the recommendation engine 120, database 130, communication module 140, and other components of the compliance management platform 110 in the present embodiment are shown as part of the compliance management platform 110, at least a portion of the recommendation engine 120, database 130, communication module 140, and other components of the compliance management platform 110 in other embodiments may be implemented on one or more other processing platforms that are accessible to the compliance management platform 110 over one or more networks. Such components can each be implemented at least in part within another system element or at least in part utilizing one or more stand-alone components coupled to the network 104.

The databases described herein are assumed to comprise one or more storage systems configured to store information relating to processing performed, data used, and to other functionality of the compliance management platform 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of compliance management platform 110 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO®, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the compliance management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, recommendation engine 120, database 130, communication module 140, and other components of the compliance management platform 110, and the elements thereof can each be implemented in the form of one or more LXCs running on one or more VMs. Other arrangements of one or more processing devices of a processing platform can be used to implement recommendation engine 120, database 130, communication module 140, as well as other components of the compliance management platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the compliance management platform 110 to reside in different data centers. Numerous other distributed implementations of the compliance management platform 110 are possible.

Accordingly, one or each of the recommendation engine 120, database 130, communication module 140, and other components of the compliance management platform 110 can each be implemented in a distributed manner so as to comprise a plurality of distributed components implemented on respective ones of a plurality of compute nodes of the compliance management platform 110.

It is to be appreciated that these and other features of illustrative embodiments are presented by way of example only, and should not be construed as limiting in any way.

Accordingly, different numbers, types and arrangements of system components such as the recommendation engine 120, database 130, communication module 140, and other components of the compliance management platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the Compliance management platform can be offered to cloud infrastructure customers or other users as part of FaaS and/or PaaS offerings.

The operation of the information processing system 100 will now be described in further detail with reference to the flow diagrams of FIGS. 3 and 4.

FIG. 3 is a flow diagram of a process for providing recommendations for data mapping between authoritative sources and enterprise controls in an illustrative embodiment. With reference to FIG. 3, the process 300 as shown includes blocks 350 through 359, and is suitable for use in the system 100 but is more generally applicable to other types of information processing systems comprising a compliance management platform configured for recommending mappings between authoritative sources and controls.

At blocks 350 and 351, one or more new authoritative sources are received and preprocessed. Pre-processing includes processes for cleaning text and preparing it for vectorization. For example, pre-processing includes, but is not necessarily limited to, removing html tags, removing withdrawn regulations (e.g., those that were merged into new regulations), removing restricted content (e.g., content that requires a subscription), removing special characters, and/or separating CamelCase and dash-spaced terms to their respective words.

As described herein, the new authoritative sources, as well as the existing controls and authoritative sources are converted into vector representations (blocks 352). Referring to blocks 353 and 354, the vector representations are compared to compute similarity scores to find existing authoritative sources and existing controls which are similar to the new authoritative sources. In addition, referring to block 355, predicted tags for the new authoritative sources are compared to assigned tags for existing controls to find similarities between the predicted and existing tags.

Referring to block 356, for each of the existing authoritative sources with a similarity score with respect to the new authoritative source that is above a certain threshold, existing controls that are currently mapped to these existing authoritative sources are selected as candidate controls which may be recommended to a user for mapping to the new authoritative source. Also, for each of the existing controls with a similarity score with respect to the new authoritative source that is above a certain threshold, these existing controls are selected as candidate controls which may be recommended to a user for mapping to the new authoritative source. Each of the existing controls with a tag similarity score with respect to the new authoritative source that is above a certain threshold may also be selected as candidate controls that may be recommended to a user for mapping to the new authoritative source.

With respect to blocks 357, 358 and 359, as discussed in more detail herein, a plurality of features for each of the control candidates are extracted (block 357) and input into a trained mapping classifier which predicts a likelihood that each candidate control will be mapped to the new authoritative source (block 358). In accordance with an embodiment of the present invention, the likelihood may be expressed as a score between 0 and 1, and if this score is above a specific threshold, the mapping of the candidate control to the new authoritative source is recommended to a user (suggested controls 359).

Based on the provided recommendations, the user can accept the mappings, reject them, or edit and then accept the mappings. The user's responses to the recommended mappings are used to retrain and better adjust the classifiers 123 and 124 for providing more accurate recommendations.

In addition, in accordance with an embodiment of the present invention, new authoritative sources for which no mapping was found are grouped together and transmitted to the user as authoritative sources that likely require mapping to a new control that does not exist in the current set of controls.

Figure 4:
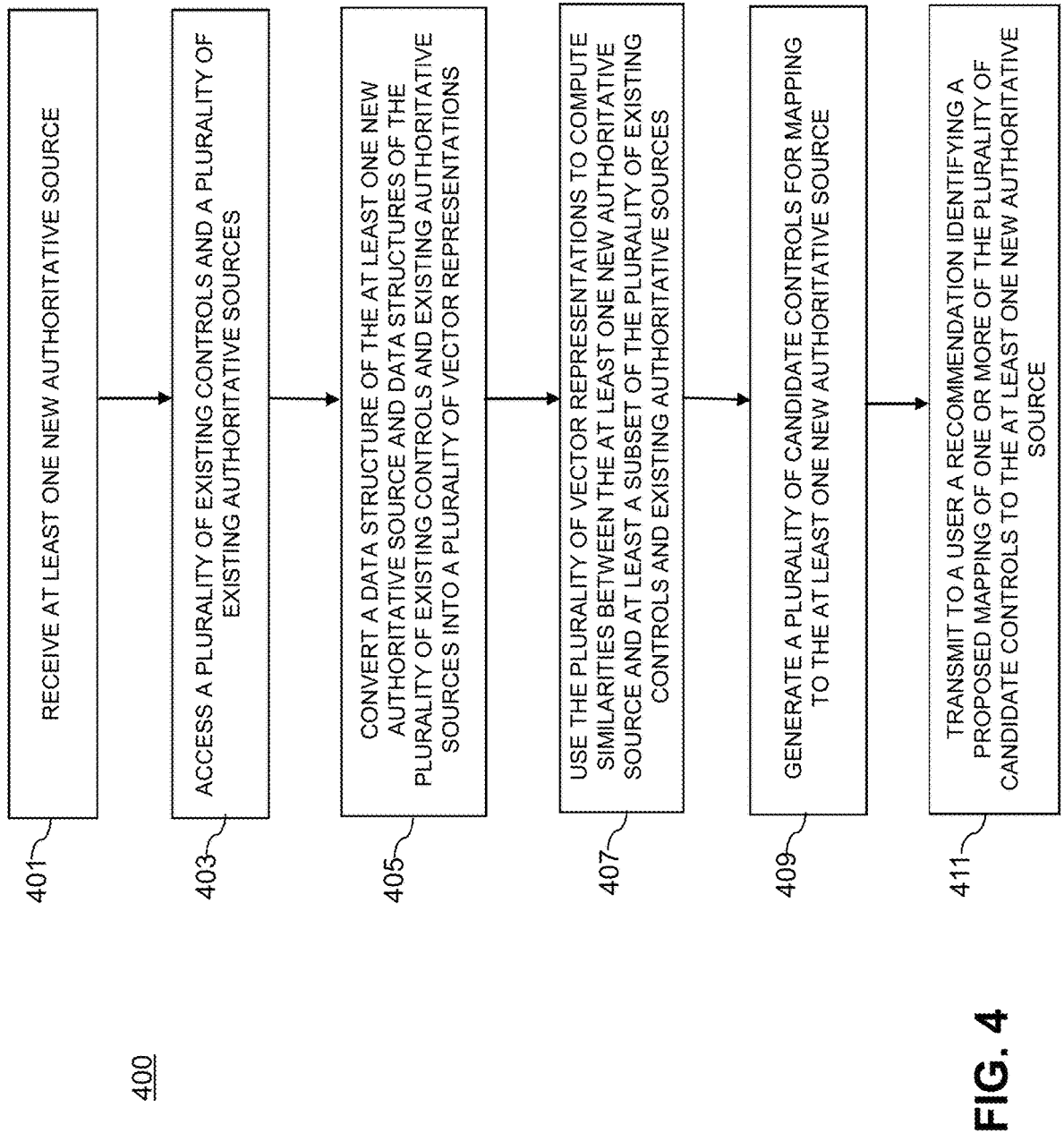
FIG. 4 is a flow diagram of a process for providing recommendations for data mapping between authoritative sources and enterprise controls in an illustrative embodiment.

With reference to FIG. 4, the process 400 as shown includes steps 401 through 411, and is suitable for use in the system 100 but is more generally applicable to other types of information processing systems comprising a compliance management platform configured for recommending mappings between authoritative sources and controls.

In steps 401 and 403, the process 400 includes receiving at least one new authoritative source, and accessing a plurality of existing controls and a plurality of existing authoritative sources. In the process, at step 405, a data structure of the at least one new authoritative source and data structures of the plurality of existing controls and existing authoritative sources are converted into a plurality of vector representations. The data structures of the new and existing authoritative sources, each comprise a plurality of levels each comprising a unique identification and/or a title. The data structures of the plurality of existing controls each comprise a statement, a unique ID and/or a title. The conversion of the data structures to the plurality of vector representations includes converting the plurality of levels into respective vector representations.

The process further includes, at step 407, using the plurality of vector representations to compute similarities between the at least one new authoritative source and at least a subset of the plurality of existing controls and existing authoritative sources. The plurality of vector representations can also be used to train a classifier for predicting one or more tags of the at least one new authoritative source.

In step 409, a plurality of candidate controls for mapping to the at least one new authoritative source are generated. The generation can be based on the computed similarities, and/or other extracted features of the at least one new authoritative source and at least the subset of the plurality of existing controls and existing authoritative sources. For example, generating the plurality of candidate controls may comprise determining whether the computed similarities between the at least one new authoritative source and at least the subset of the plurality of existing controls and existing authoritative sources exceed a threshold. Any of the plurality of existing controls which are mapped to an existing authoritative source having a computed similarity to the at least one new authoritative source exceeding the threshold, and/or any of the plurality of existing controls having a computed similarity to the at least one new authoritative source exceeding the threshold, may be selected as the plurality of candidate controls. The plurality of candidate controls are taken from the plurality of existing controls.

In accordance with an embodiment of the present invention, one or more features are extracted from the plurality of candidate controls, and inputted to a classifier for determining a likelihood that each of the plurality of candidate controls will be mapped to the at least one new authoritative source. As an example, the one or more features comprise the computed similarities between the at least one new authoritative source and at least the subset of the plurality of authoritative sources to which the plurality of candidate controls are currently mapped. The one or more features may also comprise a number of the plurality of authoritative sources to which each of the plurality of candidate controls are currently mapped.

At step 411, a recommendation identifying a proposed mapping of one or more of the plurality of candidate controls to the at least one new authoritative source is transmitted to a user. In connection with the receipt of at least one other new authoritative source, the platform 110 may determine that there are no candidate controls from the plurality of existing controls for mapping to the at least one other new authoritative source, and transmit to a user a notification of the determination.

Existing mapping between the plurality of existing controls and existing authoritative sources may be used to train a classifier for determining a likelihood that each of the plurality of candidate controls will be mapped to the at least one new authoritative source.

In the process, one or more tags of the at least one new authoritative source may be predicted, and a similarity between the one or more predicted tags and one or more tags respectively corresponding to the plurality of candidate controls may be computed.

It is to be appreciated that the FIG. 3 and FIG. 4 processes and other features and functionality described above can be adapted for use with other types of information systems configured to execute mapping recommendation services on a compliance management platform or other type of processing platform.

The particular processing operations and other system functionality described in conjunction with the flow diagrams of FIGS. 3 and 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagrams of FIGS. 3 and 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with the compliance management platform as disclosed herein can provide a number of significant advantages relative to conventional arrangements. For example, embodiments of the present invention are configured to address problems with current approaches for mapping new authoritative sources to existing controls which rely on ineffective key word searches that may be available in different text editors, such as PDF readers and word and spreadsheet processors. This conventional approaches waste computational resources by retrieving numerous non-relevant controls. Furthermore, the current techniques do not provide any prioritization of the search results and require users to review many different and irrelevant controls before finding relevant controls and determining whether the found control should be mapped to a new authoritative source.

As can be understood, current approaches, to their detriment, rely heavily on the experience of the compliance managers and their capability to remember existing sets of controls in an enterprise. Using conventional methods, compliance managers with less ability or limited experience to recall or know existing sets of controls in an enterprise will experience increased difficulty in finding relevant controls to be mapped to new authoritative sources. Using current technology, the learning curve for new compliance managers may be very long, and, therefore, extends the time for a new compliance manager to be effective.

Currently, there are no techniques or solutions which recommend mapping between existing controls and authoritative sources, and provide integrated learning according to the data collected based on the user's acceptance or rejection of the recommendations.

As an advantage, embodiments of the present invention provide a recommendation system that provides the enterprise compliance managers with recommendations for mapping between new authoritative sources and existing controls, allowing them to easily accept a recommendation, or if needed, edit the controls prior to accepting proposed mappings. This recommendation system, in accordance with embodiments of the present invention, also highlights the authoritative sources that are likely to have no corresponding control to which they may be mapped in the existing set of controls.

Advantageously, the embodiments of the present invention provide a system for the automated recommendation of highly probable mapping of existing controls to new authoritative sources, and automated generation of highly probable requirements for new controls based on a new authoritative source. The embodiments of the present invention provide a compliance manager with savings of significant and long manual efforts and much better use of their time to ensure compliance with an ever changing regulations landscape.

The embodiments of the present invention advantageously provide an improvement in current mapping technology which provides recommendations for mapping to assist the less experienced compliance manager with mapping new authoritative sources to existing controls in the enterprise by providing ranked recommendations of such mapping. Accordingly, use of the embodiments of the present invention significantly reduces the time from receipt of new authoritative sources until generation of a concrete plan for compliance with the new authoritative sources.

The embodiments of the present invention further improve the current technological solutions by providing users with insights and reasons for a mapping to be recommended, by automatically determining similar authoritative sources already mapped to existing controls, similar textual portions of existing authoritative sources and controls, and even similar intent within the existing authoritative sources and controls. The embodiments of the present invention advantageously highlight parts of a new authoritative source that are likely to require a new set of controls in addition to the existing set of controls. As an another advantage, the embodiments of the present invention provide for continuous and online machine learning to provide better results based on previous user acceptance or rejection of recommendations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the compliance management platform 110 or portions thereof are illustratively implemented for use by tenants of such a multi-tenant environment.

As mentioned previously, cloud infrastructure as disclosed herein can include cloud-based systems such as AWS, GCE and Microsoft Azure. Virtual machines provided in such systems can be used to implement at least portions of one or more of a computer system and a compliance management platform in illustrative embodiments. These and other cloud-based systems in illustrative embodiments can include object stores such as AWS S3, GCE Cloud Storage, and Microsoft Azure Blob Storage.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
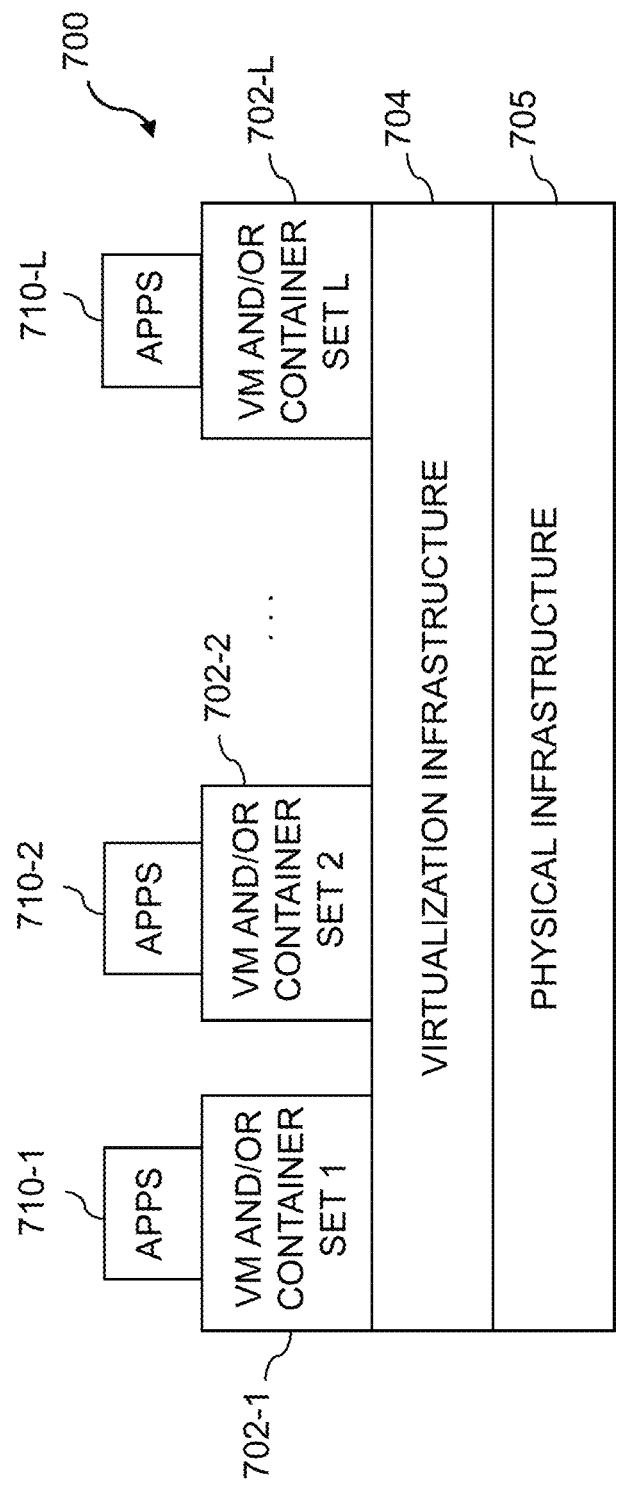
FIGS. 7 and 8 show examples of processing platforms that may be utilized to implement at least a portion of an information processing system in illustrative embodiments.
Figure 8:
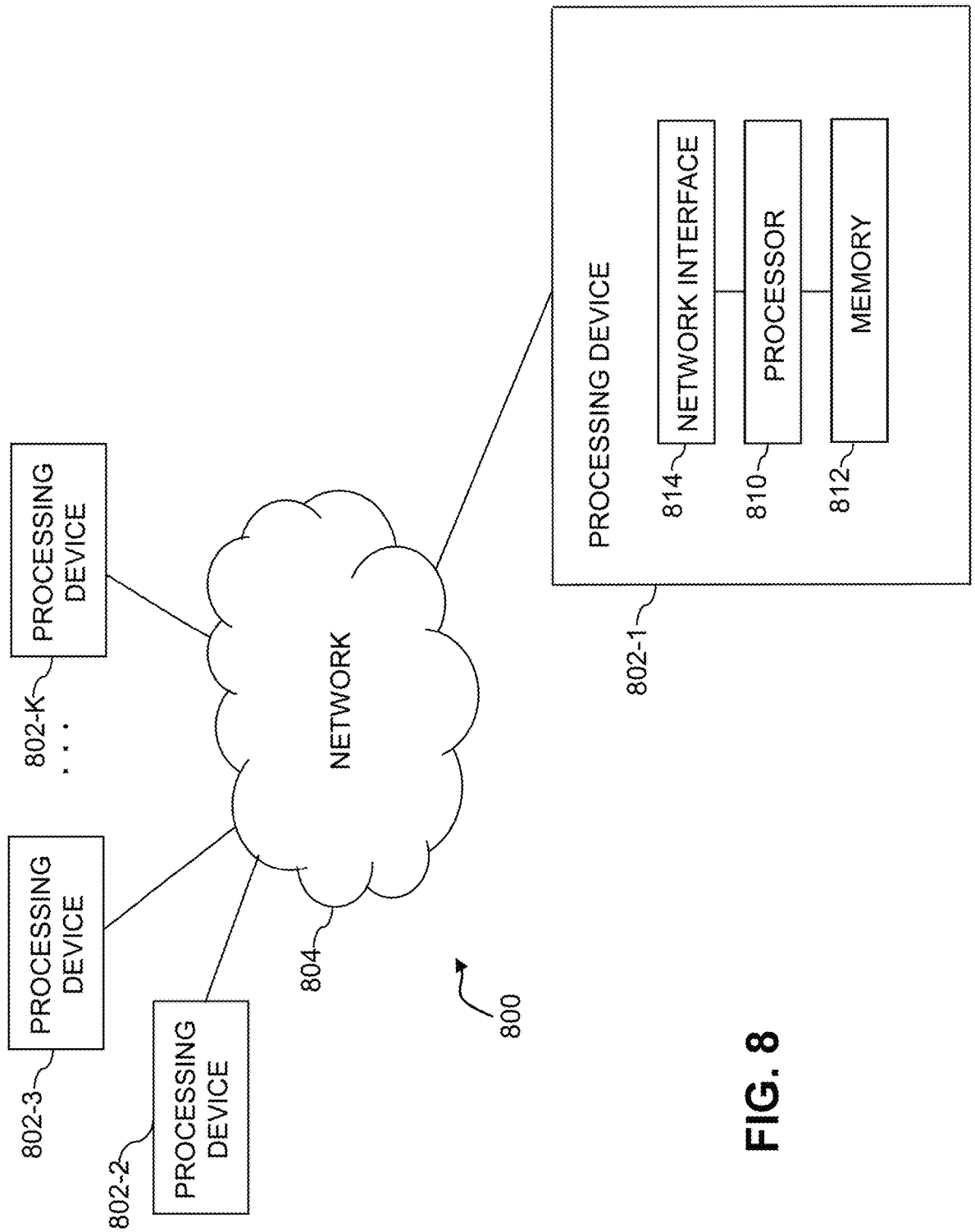

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, ... 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide compliance management functionality of the type described above for one or more processes running on a given one of the VMs. For example, each of the VMs can implement mapping recommendations and/or classifier training for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide compliance management functionality of the type described above for one or more processes running on different ones of the containers. For example, a container host device supporting multiple containers of one or more container sets can implement one or more instances of mapping recommendations and/or classifier training.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compliance management platform 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compliance management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured to:
   receive an electronic data structure comprising at least one new authoritative source;
   access a plurality of electronic data structures comprising a plurality of existing controls and a plurality of existing authoritative sources;
   wherein the electronic data structures of the at least one new authoritative source and of the plurality of existing authoritative sources each comprise a plurality of levels;
   convert the electronic data structure of the at least one new authoritative source and the electronic data structures of the plurality of existing controls and existing authoritative sources into a plurality of vector representations;
   use the plurality of vector representations to compute similarities between the at least one new authoritative source and at least a subset of the plurality of existing controls and at least a subset of the plurality of existing authoritative sources;
   input at least a subset of the plurality of vector representations corresponding to the plurality of existing authoritative sources to a first machine learning classifier to train the first machine learning classifier, wherein the first machine learning classifier uses one or more machine learning algorithms comprising at least a multi-label classification algorithm to analyze one or more of the plurality of vector representations corresponding to the at least one new authoritative source to predict one or more metadata tags for the at least one new authoritative source;
   generate a plurality of candidate controls for mapping to the at least one new authoritative source based at least in part on computed similarities between the predicted one or more metadata tags and one or more metadata tags for respective ones of the plurality of existing controls;
   wherein the plurality of candidate controls are taken from the plurality of existing controls;
   extract one or more features from the plurality of candidate controls;
   wherein the one or more features comprise the computed similarities between the at least one new authoritative source and at least the subset of the plurality of existing authoritative sources:
   input the extracted one or more features to a second machine learning classifier, wherein the second machine learning classifier uses one or more machine learning algorithms to analyze the extracted one or more features to predict a likelihood that each of the plurality of candidate controls will be mapped to the at least one new authoritative source;
   identify a proposed mapping of one or more of the plurality of candidate controls to the at least one new authoritative source based on the predicted likelihoods; and
   transmit to a user a recommendation comprising the proposed mapping.

2. The apparatus of claim 1 wherein, in performing the conversion of the electronic data structures of the at least one new authoritative source and of the plurality of existing authoritative sources to the plurality of vector representations, said at least one processing platform is configured to convert the plurality of levels into respective vector representations corresponding to respective ones of the plurality of levels.

3. The apparatus of claim 1 wherein each of the plurality of levels comprises at least one of a unique identification and a title.

4. The apparatus of claim 1 wherein said at least one processing platform is further configured to use existing mapping between the plurality of existing controls and the plurality of existing authoritative sources to train the second machine learning classifier for predicting the likelihood that each of the plurality of candidate controls will be mapped to the at least one new authoritative source.

5. The apparatus of claim 1 wherein, in generating the plurality of candidate controls, said at least one processing platform is further configured to determine whether the computed similarities between the at least one new authoritative source and at least the subset of the plurality of existing controls and at least the subset of the plurality of existing authoritative sources exceed a threshold.

6. The apparatus of claim 5 wherein, in generating the plurality of candidate controls, said at least one processing platform is further configured to select as the plurality of candidate controls any of the plurality of existing controls which are mapped to an existing authoritative source having a computed similarity to the at least one new authoritative source exceeding the threshold.

7. The apparatus of claim 5 wherein, in generating the plurality of candidate controls, said at least one processing platform is further configured to select as the plurality of candidate controls any of the plurality of existing controls having a computed similarity to the at least one new authoritative source exceeding the threshold.

8. The apparatus of claim 1 wherein the subset of the plurality of existing authoritative sources comprises existing authoritative sources to which the plurality of candidate controls are currently mapped.

9. The apparatus of claim 1 wherein the one or more features further comprise a number of the plurality of existing authoritative sources to which each of the plurality of candidate controls are currently mapped.

10. The apparatus of claim 1 wherein said at least one processing platform is further configured to:
    receive at least one other new authoritative source;
    determine that there are no candidate controls from the plurality of existing controls for mapping to the at least one other new authoritative source; and
    transmit to a user a notification of the determination.

11. A method comprising:
    receiving an electronic data structure comprising at least one new authoritative source;
    accessing a plurality of electronic data structures comprising a plurality of existing controls and a plurality of existing authoritative sources;

wherein the electronic data structures of the at least one new authoritative source and of the plurality of existing authoritative sources each comprise a plurality of levels;
converting the electronic data structure of the at least one new authoritative source and the electronic data structures of the plurality of existing controls and existing authoritative sources into a plurality of vector representations;
using the plurality of vector representations to compute similarities between the at least one new authoritative source and at least a subset of the plurality of existing controls and at least a subset of the plurality of existing authoritative sources;
inputting at least a subset of the plurality of vector representations corresponding to the plurality of existing authoritative sources to a first machine learning classifier to train the first machine learning classifier, wherein the first machine learning classifier uses one or more machine learning algorithms comprising at least a multi-label classification algorithm to analyze one or more of the plurality of vector representations corresponding to the at least one new authoritative source to predict one or more metadata tags for the at least one new authoritative source;
generating a plurality of candidate controls for mapping to the at least one new authoritative source based at least in part on computed similarities between the predicted one or more metadata tags and one or more metadata tags for respective ones of the plurality of existing controls;
wherein the plurality of candidate controls are taken from the plurality of existing controls;
extracting one or more features from the plurality of candidate controls;
wherein the one or more features comprise the computed similarities between the at least one new authoritative source and at least the subset of the plurality of existing authoritative sources;
inputting the extracted one or more features to a second machine learning classifier, wherein the second machine learning classifier uses one or more machine learning algorithms to analyze the extracted one or more features to predict a likelihood that each of the plurality of candidate controls will be mapped to the at least one new authoritative source;
identifying a proposed mapping of one or more of the plurality of candidate controls to the at least one new authoritative source based on the predicted likelihoods; and
transmitting to a user a recommendation comprising the proposed mapping;
wherein the method is performed by at least one processing platform comprising at least one processing device comprising a processor coupled to a memory.

12. The method of claim 11 wherein generating the plurality of candidate controls comprises determining whether the computed similarities between the at least one new authoritative source and at least the subset of the plurality of existing controls and at least the subset of the plurality of existing authoritative sources exceed a threshold.

13. The method of claim 12 wherein generating the plurality of candidate controls further comprises selecting as the plurality of candidate controls any of the plurality of existing controls which are mapped to an existing authoritative source having a computed similarity to the at least one new authoritative source exceeding the threshold.

14. The method of claim 12 wherein generating the plurality of candidate controls further comprises selecting as the plurality of candidate controls any of the plurality of existing controls having a computed similarity to the at least one new authoritative source exceeding the threshold.

15. A computer program product comprising a non-transitory processor-readable storage medium having stored therein program code of one or more software programs, wherein the program code when executed by at least one processing platform causes said at least one processing platform to:
receive an electronic data structure comprising at least one new authoritative source;
access a plurality of electronic data structures comprising a plurality of existing controls and a plurality of existing authoritative sources;
wherein the electronic data structures of the at least one new authoritative source and of the plurality of existing authoritative sources each comprise a plurality of levels;
convert the electronic data structure of the at least one new authoritative source and the electronic data structures of the plurality of existing controls and existing authoritative sources into a plurality of vector representations;
use the plurality of vector representations to compute similarities between the at least one new authoritative source and at least a subset of the plurality of existing controls and at least a subset of the plurality of existing authoritative sources;
input at least a subset of the plurality of vector representations corresponding to the plurality of existing authoritative sources to a first machine learning classifier to train the first machine learning classifier, wherein the first machine learning classifier uses one or more machine learning algorithms comprising at least a multi-label classification algorithm to analyze one or more of the plurality of vector representations corresponding to the at least one new authoritative source to predict one or more metadata tags for the at least one new authoritative source;
generate a plurality of candidate controls for mapping to the at least one new authoritative source based at least in part on computed similarities between the predicted one or more metadata tags and one or more metadata tags for respective ones of the plurality of existing controls;
wherein the plurality of candidate controls are taken from the plurality of existing controls;
extract one or more features from the plurality of candidate controls;
wherein the one or more features comprise the computed similarities between the at least one new authoritative source and at least the subset of the plurality of existing authoritative sources:
input the extracted one or more features to a second machine learning classifier, wherein the second machine learning classifier uses one or more machine learning algorithms to analyze the extracted one or more features to predict a likelihood that each of the plurality of candidate controls will be mapped to the at least one new authoritative source;

identify a proposed mapping of one or more of the plurality of candidate controls to the at least one new authoritative source based on the predicted likelihoods; and transmit to a user a recommendation comprising the proposed mapping.

16. The computer program product of claim 15 wherein, in generating the plurality of candidate controls, the program code causes said at least one processing platform to determine whether the computed similarities between the at least one new authoritative source and at least the subset of the plurality of existing controls and at least the subset of the plurality of existing authoritative sources exceed a threshold.

17. The computer program product of claim 16 wherein, in generating the plurality of candidate controls, the program code further causes said at least one processing platform to select as the plurality of candidate controls any of the plurality of existing controls which are mapped to an existing authoritative source having a computed similarity to the at least one new authoritative source exceeding the threshold.

18. The computer program product of claim 16 wherein, in generating the plurality of candidate controls, the program code further causes said at least one processing platform to select as the plurality of candidate controls any of the plurality of existing controls having a computed similarity to the at least one new authoritative source exceeding the threshold.

19. The computer program product of claim 15 wherein, in performing the conversion of the electronic data structures of the at least one new authoritative source and of the plurality of existing authoritative sources to the plurality of vector representations, the program code causes said at least one processing platform to convert the plurality of levels into respective vector representations corresponding to respective ones of the plurality of levels.

20. The computer program product of claim 15 wherein the program code further causes said at least one processing platform to use existing mapping between the plurality of existing controls and the plurality of existing authoritative sources to train the second machine learning classifier for predicting the likelihood that each of the plurality of candidate controls will be mapped to the at least one new authoritative source.

* * * * *